US012638319B2

(12) United States Patent
Zimmerman et al.

(10) Patent No.: US 12,638,319 B2
(45) Date of Patent: May 26, 2026

(54) METERS HAVING NON-CONDUCTING MEASURING CHAMBERS AND METALLIC ENCLOSURES

(71) Applicant: Sensus Spectrum, LLC, Morrisville, NC (US)

(72) Inventors: Michael Zimmerman, Addison, PA (US); Johnathan Wimbish, Raleigh, NC (US)

(73) Assignee: Sensus Spectrum, LLC, Morrisville, NC (US)

( * ) Notice: Subject to any disclaimer, the term of this patent is extended or adjusted under 35 U.S.C. 154(b) by 333 days.

(21) Appl. No.: 18/359,129

(22) Filed: Jul. 26, 2023

(65) Prior Publication Data

US 2024/0035866 A1     Feb. 1, 2024

Related U.S. Application Data

(60) Provisional application No. 63/392,687, filed on Jul. 27, 2022.

(51) Int. Cl.
   *G01F 1/58*         (2006.01)
   *G01F 15/18*       (2006.01)
   *G01F 15/14*       (2006.01)

(52) U.S. Cl.
   CPC ............ *G01F 1/588* (2013.01); *G01F 15/185* (2013.01); *G01F 15/14* (2013.01)

(58) Field of Classification Search
   CPC ...... G01F 1/56–64; G01F 15/14; G01F 15/18; G01F 15/185
   See application file for complete search history.

(56) References Cited

U.S. PATENT DOCUMENTS

| | | | | |
|---|---|---|---|---|
| 8,127,622 | B2 * | 3/2012 | Kawakami | .............. G01F 1/588 |
| | | | | 73/861.12 |
| 8,776,593 | B2 | 7/2014 | Margalit | |
| 9,109,933 | B2 * | 8/2015 | Fukano | ................... G01F 15/18 |
| 10,712,186 | B2 * | 7/2020 | Momose | ................ G01F 1/584 |
| 11,175,169 | B2 | 11/2021 | Zimmerman | |
| 2014/0298920 | A1 | 10/2014 | Fukano et al. | |
| 2019/0285443 | A1 | 9/2019 | Momose et al. | |
| 2020/0056914 | A1 * | 2/2020 | Kimura | .................... G01F 1/58 |

FOREIGN PATENT DOCUMENTS

| | | |
|---|---|---|
| CN | 111344538 A | 6/2020 |
| DE | 102007004825 A1 | 8/2008 |

OTHER PUBLICATIONS

International Search Report and Written Opinion, PCT Application No. PCT/US2023/071011; filed Jul. 26, 2023; 11 pages.

* cited by examiner

*Primary Examiner* — Justin N Olamit
(74) *Attorney, Agent, or Firm* — Stanek Lemon Crouse & Meeks, PA

(57) ABSTRACT

A magnetic meter is provided. The magnetic meter includes a flowtube having an inlet on a first end and an outlet on a second end, the inlet and outlet defining a direction of flow. The magnetic meter also includes a metal enclosure surrounding the flowtube. The metal enclosure is in fluid communication with the inlet and outlet of the flowtube and the metal enclosure extends, in the direction of flow, upstream beyond the inlet on the first end and downstream beyond the outlet on the second end of the flowtube. A method, meters and a metering system are also provided.

21 Claims, 9 Drawing Sheets

METERS HAVING NON-CONDUCTING MEASURING CHAMBERS AND METALLIC ENCLOSURES

CLAIM OF PRIORITY

Priority is hereby claimed to U.S. Provisional Application No. 63/392,687, filed Jul. 27, 2022, entitled METERS HAVING NON-CONDUCTING MEASURING CHAMBERS AND METALLIC ENCLOSURES, the entire contents of which are hereby incorporated by reference herein as if set forth in their entirety.

FIELD

The present inventive concept relates generally to magnetic meters and, more particularly, to magnetic meters having smaller non-conductive measuring chambers.

BACKGROUND

Residential magnetic meters require a non-conductive measuring chamber for the function of the meter. In conventional meters, providing this non-conductive measuring chamber is accomplished by having a plastic flowtube that spans from the inlet of the meter to the outlet of the meter.

Conventional hybrid fluid flow meter pressure vessel assemblies include an interior housing fabricated from plastic and an exterior ring structure, such as unitary exterior ring structure, fabricated from metal.

A system for connecting a central module to a network is known. The central module has an inlet and an outlet, a first connector, a second connector and at least one fastening mechanism to secure the first and second connectors to the central module so a sealed connection is provided through the central module to the network.

SUMMARY

Some embodiments of the present inventive concept provide magnetic meters including a flowtube having an inlet on a first end and an outlet on a second end, the inlet and outlet defining a direction of flow and a metal enclosure surrounding the flowtube, the metal enclosure being in fluid communication with the inlet and outlet of the flowtube, the metal enclosure extending, in the direction of flow, upstream beyond the inlet on the first end and downstream beyond the outlet on the second end of the flowtube.

In further embodiments, the magnetic meter may include a housing surrounding the flowtube and the metal enclosure, the housing extending, in the direction of flow, upstream beyond the inlet on the first end and downstream beyond the outlet on the second end of the flowtube. The metal enclosure may extend, in the direction of flow, beyond the housing in at least one of the upstream and downstream directions. A length of the flowtube from the first end to the second end may be less than a length of the housing and the length of the housing may be less than a length of the metal enclosure.

In still further embodiments the flowtube includes a chamber between the inlet and the outlet, an inlet tube upstream of the chamber in the direction of flow and an outlet tube downstream of the chamber in the direction of flow, the inlet tube including the first end and inlet, the outlet tube including the second end and outlet. The magnetic meter may also include a magnetic assembly adjacent the chamber, the metal enclosure surrounding the magnetic assembly; a meter register near the flowtube, the meter register positioned outside of the metal enclosure and a housing surrounding the flowtube, the metal enclosure, the magnetic assembly and the meter register, the housing extending, in the direction of flow, upstream beyond the inlet on the first end and downstream beyond the outlet on the second end of the flowtube.

In some embodiments, the metal enclosure may include a plurality of connectable components, that, when connected, extend, in the direction of flow, upstream beyond the inlet on the first end and downstream beyond the outlet on the second end of the flowtube.

In further embodiments, the flowtube may be electrically non-conductive, a plastic and/or a polymer. The metal enclosure may be electrically conductive and may include metal threads.

In still further embodiments, the metal enclosure may include a meter inlet tube having a first internal conduit in fluid communication with the inlet and a meter outlet tube having a second internal conduit in fluid communication with the outlet, the first internal conduit may extend from the inlet upstream in the direction of flow and the second internal conduit may extend from the outlet downstream in the direction of flow. A housing may surround the flowtube, the metal enclosure, the first internal conduit and the second internal conduit. The housing may extend, in the direction of flow, upstream beyond the inlet on the first end and downstream beyond the outlet on the second end of the flowtube, the meter inlet tube may extend, in the direction of flow, upstream beyond the housing; and the meter outlet tube may extend, in the direction of flow, downstream beyond the housing. The meter inlet tube or the meter outlet tube may include metal threads. A length of the flowtube from the first end to the second end in the direction of flow may be less than a length of the metal enclosure in the direction of flow.

Some embodiments of the present inventive concept provide a method including transporting flow in a first direction through a metal vessel; further transporting flow in the first direction through a measuring vessel that is in communication with the metal vessel at an inlet of the measuring vessel; and further transporting flow in the first direction through the metal vessel, the metal vessel being in communication with an outlet of the measuring vessel.

Further embodiments of the present inventive concept provide metering systems and meters.

DETAILED DESCRIPTION

Figure 1:
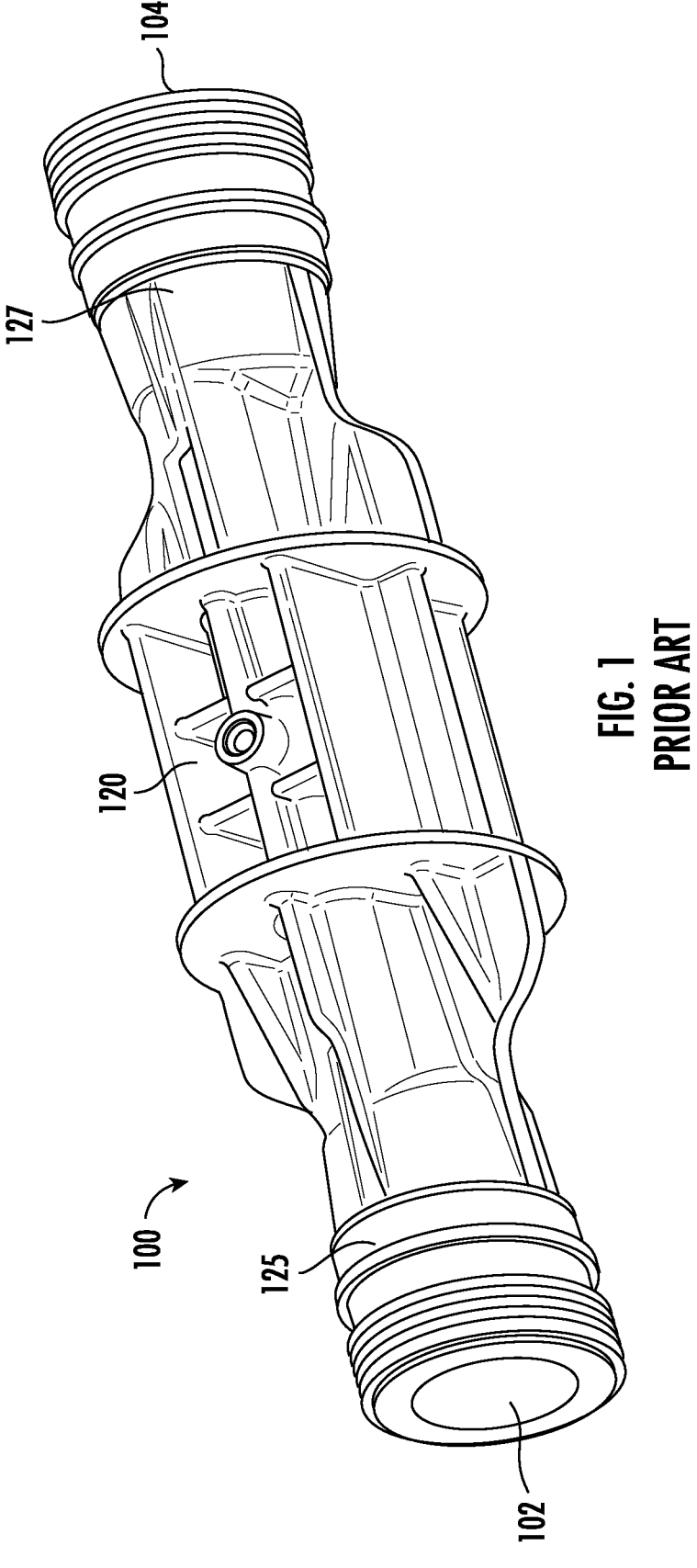
FIG. 1 is a diagram illustrating a conventional flowtube for a conventional meter.

The present inventive concept will be described more fully hereinafter with reference to the accompanying figures, in which embodiments of the inventive concept are shown. This inventive concept may, however, be embodied in many alternate forms and should not be construed as limited to the embodiments set forth herein.

Accordingly, while the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the inventive concept is to cover all modifications, equivalents, and alternatives falling within the spirit and scope of the inventive concept as defined by the claims. Like numbers refer to like elements throughout the description of the figures.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this inventive concept belongs. It will be further understood that terms used herein should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

Figure 2:
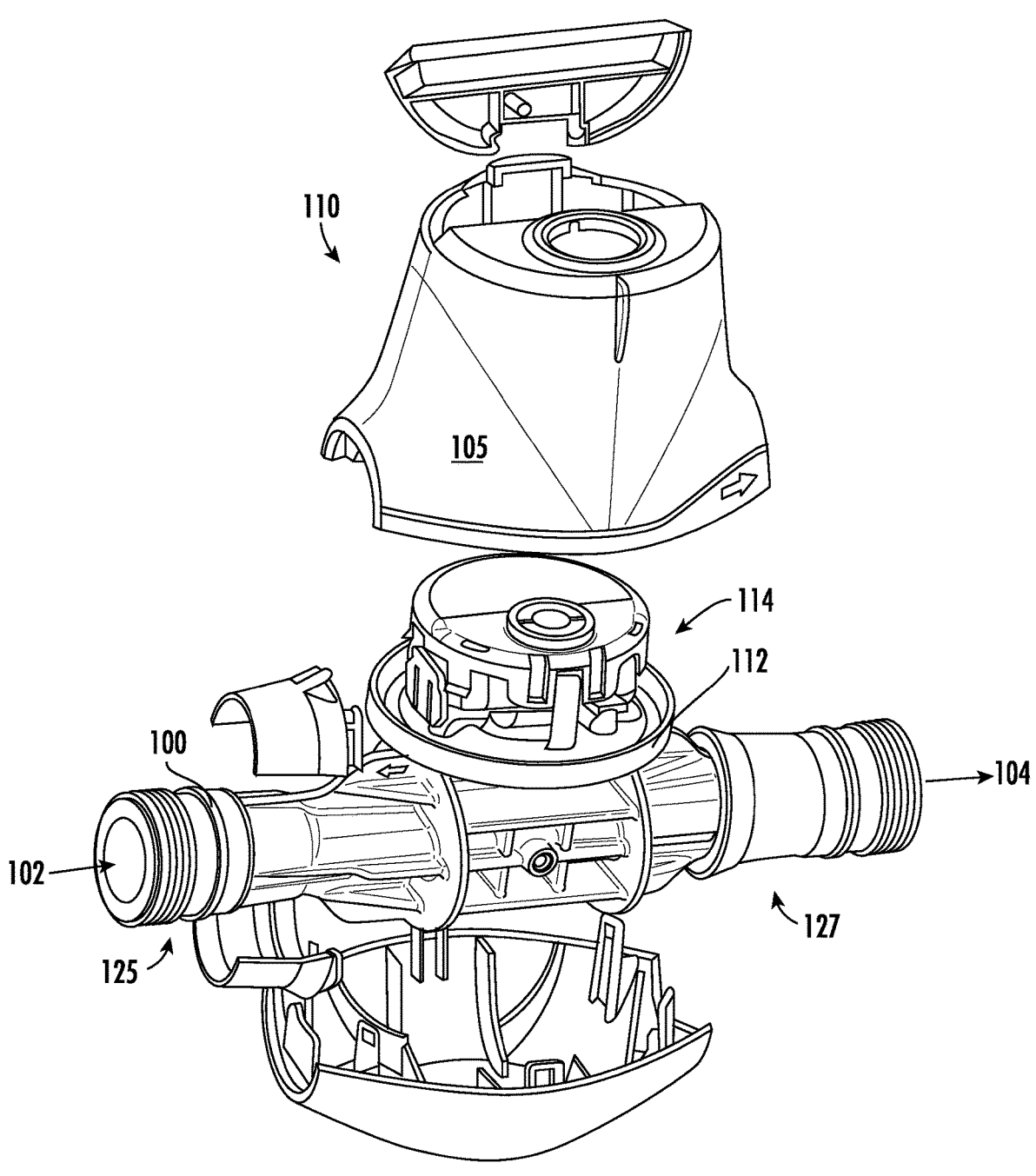
FIG. 2 is a diagram illustrating an exploded view of a conventional meter including the flowtube of FIG. 1.

As discussed in the background, in conventional meters, a plastic or polymeric flowtube that spans from the inlet of the meter to outlet of the meter is used to provide the non-conductive measuring chamber. For example, a conventional flowtube 100 is illustrated in FIG. 1. FIG. 2 is an exploded view of a meter 110 including the flowtube 100 illustrated in FIG. 1. The flowtube is the pressure vessel and measuring section of the meter. As illustrated in FIGS. 1 and 2, the flowtube 100 extends from an inlet 102 of meter 110 to an outlet 104 of the meter 110. In particular, the flowtube 100 of FIG. 1 has a centrally located measuring chamber 120 and two tubes extending laterally therefrom. Inlet tube 125 extends from measuring chamber 120 and includes inlet 102 on the distal end and outlet tube 127 extends from measuring chamber 120 and includes outlet 104 on the distal end.

As illustrated in FIG. 2, a meter housing 105 surrounds the flowtube 100 and additional meter components including the meter register 114 and cap 112. The inlet tube 125 and the outlet tube 127 extend laterally beyond an end of the meter housing 105 and when installed, are further connected to additional tubing or piping (not shown). Furthermore, the meter 110 illustrated in FIG. 2 is made of plastic or polymer materials which, as discussed above, have in some instances exhibited insufficient mechanical strength when installed in certain areas.

Meters installed underground are subject to stress from above including stresses from weight above including weight of the soil, weight from objects above ground, changes in the topography and soil structure and changes in the water content of the soil. For example, plastic meters installed underground that experience stress from the weight above, the ground in which the meter is installed, may shift from side to side, break, crack, deflect, deform and the like.

In particular, bending is an issue in the field when plastic or polymer meters are installed poorly. Bending occurs when the ends of pipes (not shown) connected to the meter 110 are not co-axial, properly threaded and/or not correctly spaced from face to face of the pipe. Furthermore, bending can also occur with proper installation but in areas where the soil is known to have high amounts of movement. For example, movement may be caused by changes in clay water content, going from dry to wet in certain clays with a high degree of swell due to water content.

Accordingly, some embodiments of the present inventive concept provide a shorter flowtube that does not extend the entire length of the meter and/or that does not extend outside the meter housing. The present inventive concept also includes a metal enclosure around the shorter non-conductive flowtube. The metal enclosure is in fluid communication with the flowtube and includes an inlet and outlet of the meter. Thus, the necessity for having a non-conductive measuring chamber is provided by the shorter flowtube and the meter is made stronger and more robust by having the metal enclosure thereon as will be discussed further below with respect to the figures. In addition, some embodiments of the present inventive concept provide metal threads which are more robust than plastic or polymeric threads, easier to install on site and less prone to cross-threading than polymeric or plastic threads. The metal threads of the metal enclosure can be connected to upstream and downstream piping.

It will be understood that although the enclosure is discussed herein as being metal, shorter flowtubes in accordance with embodiments of the present inventive concept may be used with non-metal enclosures without departing from the scope of the present inventive concept.

Figure 3:
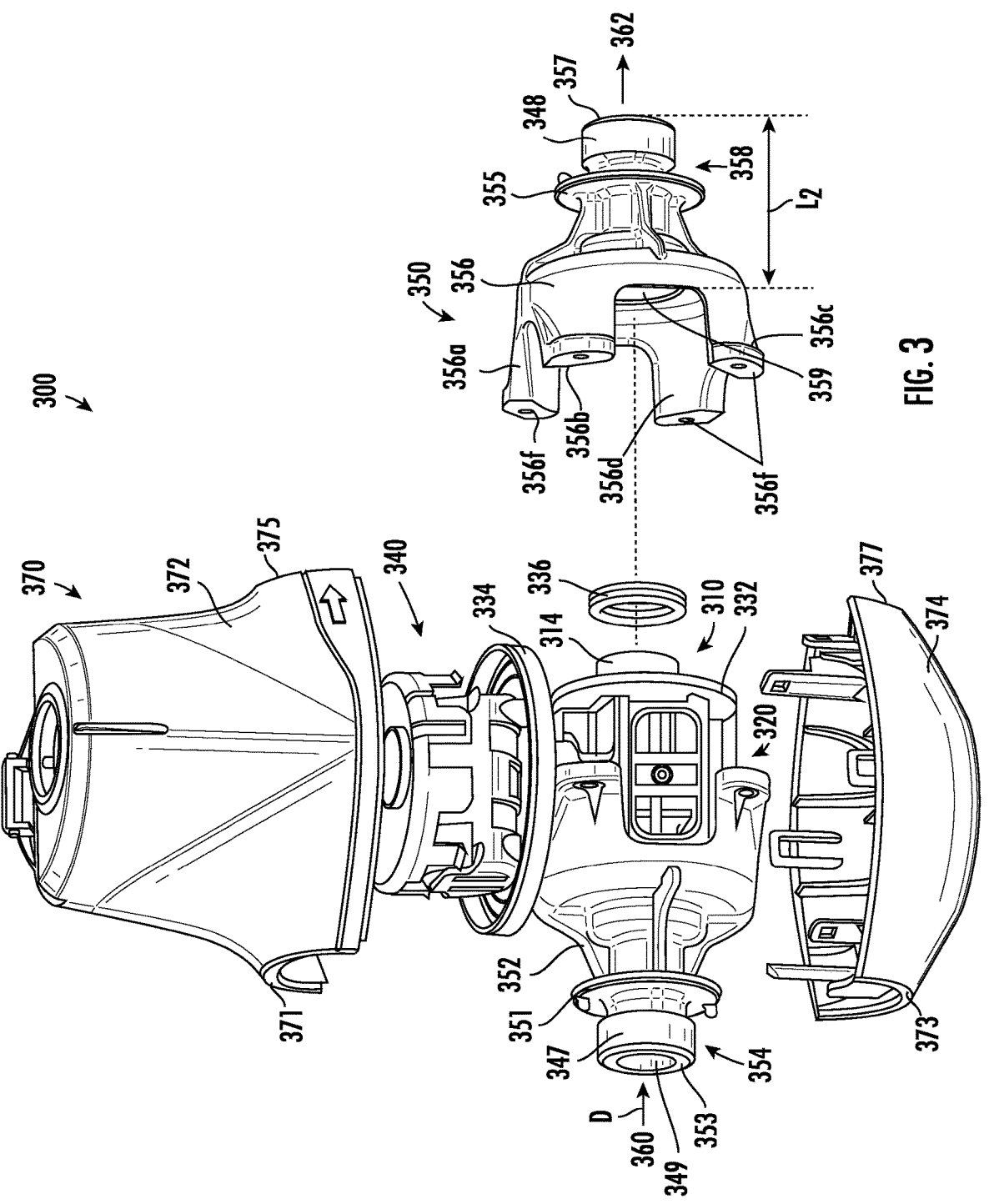
FIGS. 3 and 4 are diagrams of exploded views of a magnetic meter in accordance with some embodiments of the present inventive concept.
Figure 4:
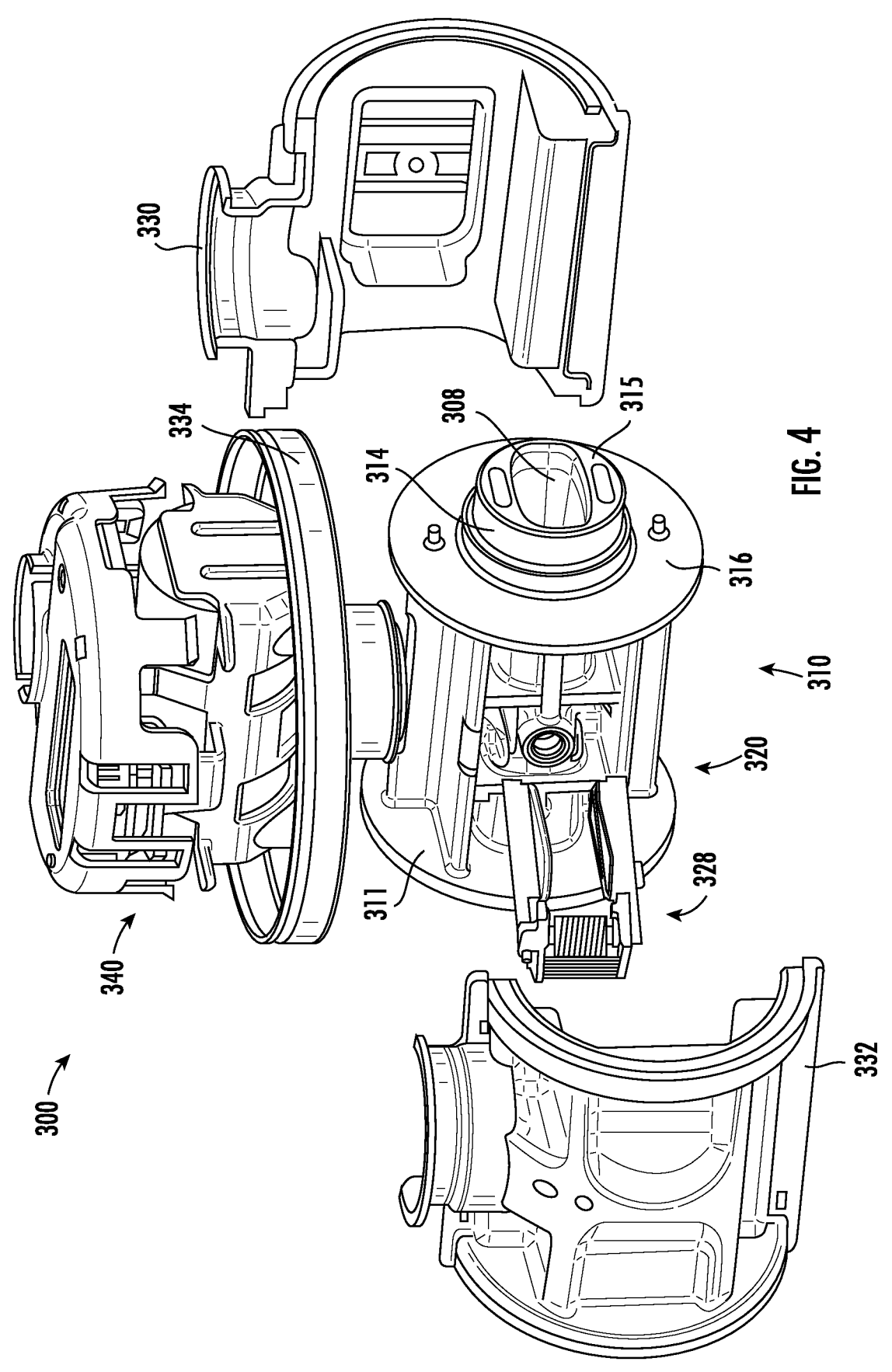
Figure 5:
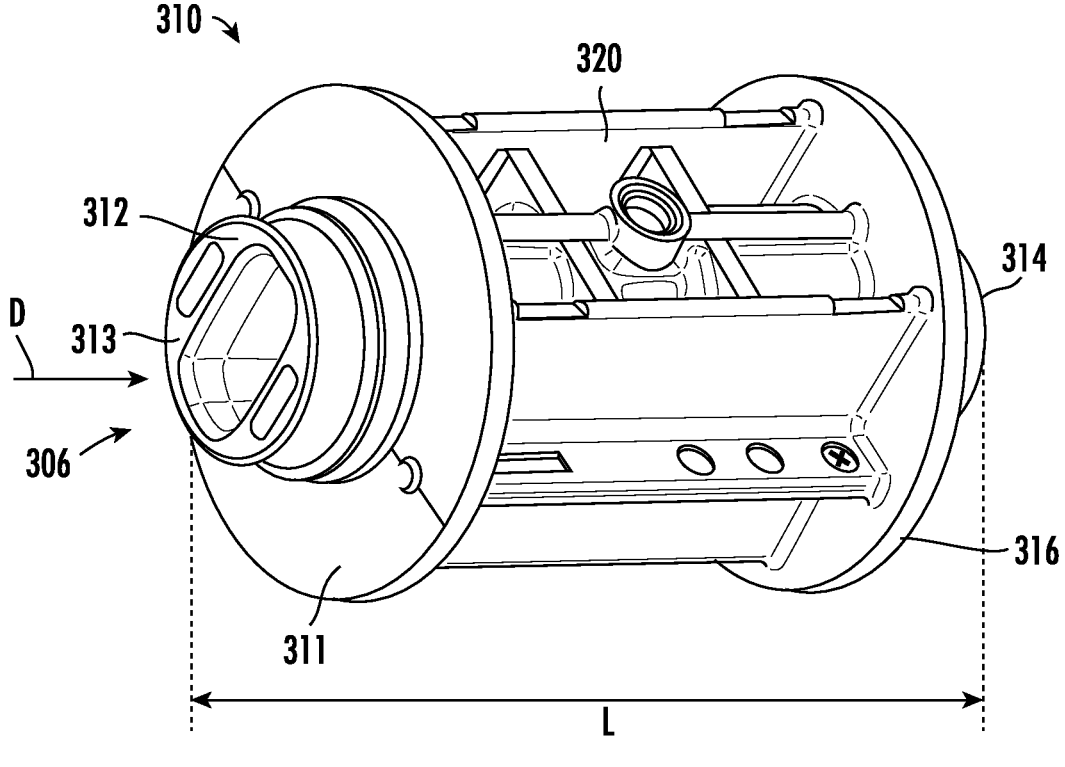
FIG. 5 is a diagram illustrating a flowtube in accordance with some embodiments of the present inventive concept.

Referring first to FIGS. 3, 4 and 6, a meter 300 in accordance with some embodiments of the present inventive concept will be discussed. Meter 300 includes a flowtube 310 having a centrally located measuring chamber 320 and two tubes 312, 314 extending laterally from measuring chamber 320. Inlet tube 312 extends upstream from a rib 311 on an inlet side of measuring chamber 320 to a distal end 313. Distal end 313 includes a flowtube inlet 306. Outlet tube 314 extends downstream from a rib 316 on an outlet side of measuring chamber 320 to a distal end 315. Distal end 315 includes flowtube outlet 308. As shown in FIG. 5, a length L of flowtube 310 extends from inlet distal end 313 to outlet distal end 315. Flow moves through the flowtube 310 from the inlet 306 to the outlet 308 in a direction D.

Referring again to FIGS. 3 and 4, a magnetic assembly 328 slides into flowtube 310. Magnetic assembly 328 creates a magnetic field in measuring chamber 320 so the meter can function. Potting shells 330, 332 are attached to flowtube 310 so as to surround measuring chamber 320. In the embodiments shown, potting shells 330, 332 extend laterally between ribs 311, 316. Potting shells 330, 332 may be connected or fastened to each other and/or to flowtube 310.

In accordance with the present inventive concept, a metal enclosure 350 is provided. Metal enclosure 350 includes a plurality of metal components; two metal spuds 352, 356 and two metal flanges 351, 355 in the illustrated embodiment. An inlet tube 354 extends upstream from flange 351 to a distal end 353. Distal end 353 includes a meter inlet 360. An internal conduit 349 extends from distal end 353 through metal spud 352 illustrated by a length $L_2$ with respect to metal spud 356. The internal conduit 349 is configured to be in fluid communication with inlet 306 of flowtube 310 when the meter 300 is assembled. Flow is transported in direction D from meter inlet 360 to measuring chamber 320 via internal conduit 349. An outlet tube 358 extends downstream from flange 355 to a distal end 357. Distal end 357 includes a meter outlet 362. An internal conduit 359 extends from distal end 357 a length $L_2$ through metal spud 356. Internal conduit 359 is configured to be in fluid communication with outlet 308 of flowtube 310 when meter 300 is assembled. Flow is transported in direction D downstream away from measuring chamber 320 via internal conduit 359 to meter outlet 362. The direction of flow D may be defined by inlet 306 and outlet 308 and/or meter inlet 360 and meter outlet 362.

Metal spuds 352, 356 are configured to surround flowtube 310 with potting shells 330, 332 thereon and metal spuds 352, 356 are configured to be in fluid communication with flowtube 310. In the embodiment illustrated in FIG. 3, metal spuds 352, 356 are arranged around either distal end 313, 315 of flowtube 310 such that the flowtube 310 does not extend beyond the metal enclosure 350, i.e. the distal ends 313, 315 of flowtube 310 are within metal enclosure 350. As further illustrated in FIGS. 3 and 5, metal enclosure 350 extends across the length L of flowtube 310 and beyond in both the upstream and downstream directions with respect to the direction D of flow. Couplers or end caps 347, 348 may be placed over distal ends 353, 357. A part or all of inlet tube 354 and outlet tube 358 adjacent distal ends 353, 357, respectively, may be threaded externally so meter 300 can be coupled to additional components. Internal conduits 349, 359 may also be threaded near the distal ends 353, 357 so meter 300 can be connected to further components at the inlet 360 and outlet 362, respectively. Gaskets may be used in addition to couplers to connect meter 300 to additional components. The metal enclosure and flowtube configurations including the couplers, connectors, and threading, may vary as desired and vary for different meter models. For example, flowtube inlet 306 and outlet 308 may be threaded to internal conduits 349, 359 or metal spuds 352, 356. Additionally, metal spuds 352, 356 may be pushed onto or into flowtube 310 for assembly.

Metal spuds 352, 356 may be fastened together, for example, via metal screws or other connectors, adhesives, or fasteners, to enclose flowtube 310. Alternatively, metal spuds 352, 356 may be connected to potting shells 330, 332 and/or flowtube 310. Metal spuds 352, 356 may be fastened together using many different methods without departing from the scope of the present inventive concept. A seal 336, for example, a tri-lobe seal, may be provided between tubes 312, 314 and metal spuds 352, 356, respectively. As illustrated in FIG. 3, the metal enclosure 350 is positioned around the flowtube 310 without a conduit liner therebetween, however, conduit liners may be used without departing from the scope of the present inventive concept. In addition, metal enclosure 350 and metal spuds 352, 356 may be designed to accommodate flowtubes 310 as desired. Metal enclosure 350 may include two base components, for example, two metal spuds, 352, 356, or may include one or more components, for example, three, four or more.

In some embodiments of the present inventive concept, the metal enclosure 350 is in-line with the measuring chamber 320 and/or flowtube 310 and the metal enclosure 350 is electrically connected from the meter inlet 360 to the meter outlet 362 which provides an electrical bypass around flowtube 310, the metrology engine. The metal enclosure 350 can be adapted to different meter lengths and accommodate a variety of thread sizes to allow for installation in various conditions and on numerous meters including, for example, ⅝", ¾" long, ¾ " short and 1" meter thread sizes.

A cap 334 above measuring chamber 320 serves as a base for meter register 340. The meter register 340 is hermetically sealed and includes the electronics for the meter 300. A housing 370 including first housing 372 and a second housing 374 are provided. The first housing 372 is configured to enclose the meter register 340, cap 334 and top portion of flowtube 310 surrounded by metal enclosure 350. The second housing 374 is configured to enclose a bottom portion of flowtube 310 surrounded by metal enclosure 350. As will be explained in more detail below with respect to FIGS. 6A and 6B, once assembled, housing 370 encloses flowtube 310. Housing 370 surrounds metal enclosure 350 from flange 351 to flange 355. Thus, the flowtube 310 and measuring chamber 320 are surrounded by potting shells 330, 332, metal enclosure 350 and housing 370.

Water or flow enters the meter 300 at meter inlet 360 and travels in direction D through internal conduit 349 to inlet 306 of flowtube 310. The water or flow continues through measuring chamber 320 before exiting the outlet 308 of flowtube 310 and traveling through internal conduit 359 to meter outlet 362.

It will be understood that the enclosure 350 illustrated in FIG. 3 is provided as an example only and embodiments of the present inventive concept are not limited to configurations illustrated therein. In some embodiments, the enclosure 350 is a metal enclosure, for example, brass. Providing this enclosure in metal provides a stronger meter 300 that can withstand conditions in which the polymer meter may have failed. It will be understood that the shorter flowtube 310 discussed herein can be used in a polymer meter without departing from the present inventive concept.

Referring to FIG. 5, a non-conductive flowtube 310 in accordance with some embodiments of the present inventive concept will be discussed. The flowtube 310 may be made of plastic or polymer. Alternatively, the flowtube 310 may be metal or other conductive material and include a non-conductive liner. As illustrated in FIG. 5, the flowtube 310 has a length L from the inlet distal end 313 to the outlet distal end 315 and is shorter than the flowtube 100 shown, for example, in FIG. 1 and may be, for example, significantly shorter. In particular, the flowtube 310 includes a centrally located measuring chamber 320 and inlet tube 312 and outlet tube 314 extending laterally therefrom. Inlet tube 312 and outlet tube 314 are also shorter than the inlet tube 125 and outlet tube 127, respectively, of the flowtube 100 of FIG. 1, and may be, for example, significantly shorter. For example, in some embodiments a length of the inlet tube 312 and outlet tube 314 extending away from ribs 311, 316, respectively, and measuring chamber 320 may only be 0.75 inches. While the length of inlet tube 312 and outlet tube 314 may vary as desired, it is preferable for tubes 312, 314 to be shorter in length than conventionally known and for a length L of flowtube 310 to be shorter in length than conventional flowtubes, for example by 50 mm or more. Thus, the inlet tube 312 and outlet tube 314 of flowtube 310 do not extend beyond metal enclosure 350 or housing 370 of the meter 300. This is shown, for example, in FIGS. 3, 7 and 8 which illustrates meter 300 including flowtube 310, metal enclosure 350 and housing 370 in accordance with some embodiments of the present inventive concept. Each rib 311, 316 may be comprised of a single piece or a plurality of pieces.

Figure 6A:
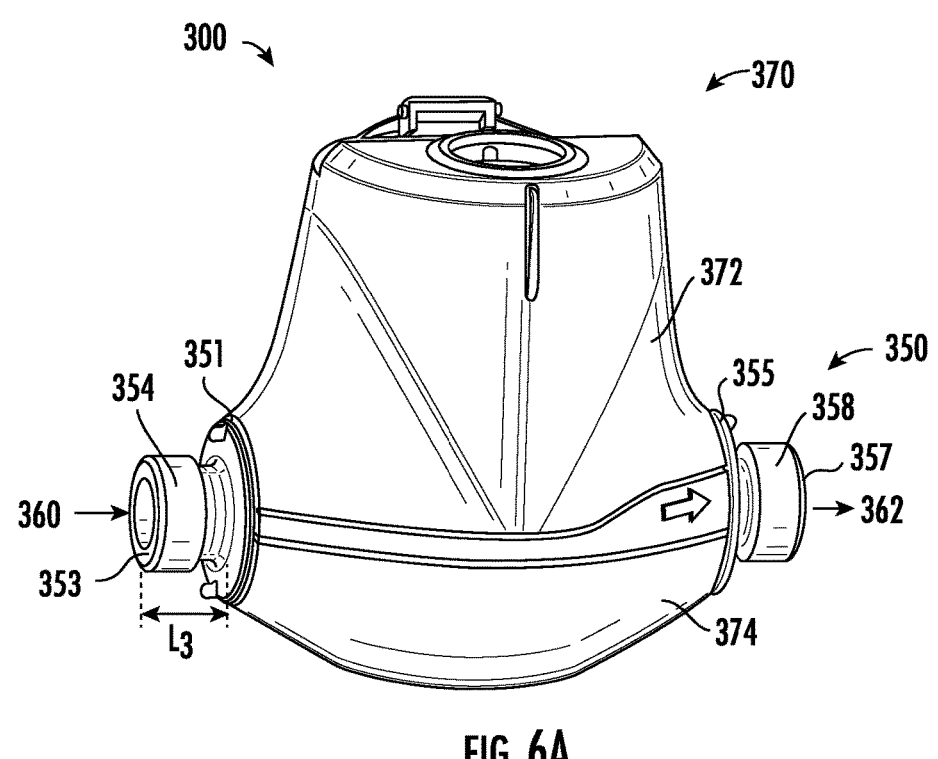
FIGS. 6A and 6B are diagrams illustrating various lengths of a metal enclosure in accordance with some embodiments of the present inventive concept.
Figure 6B:
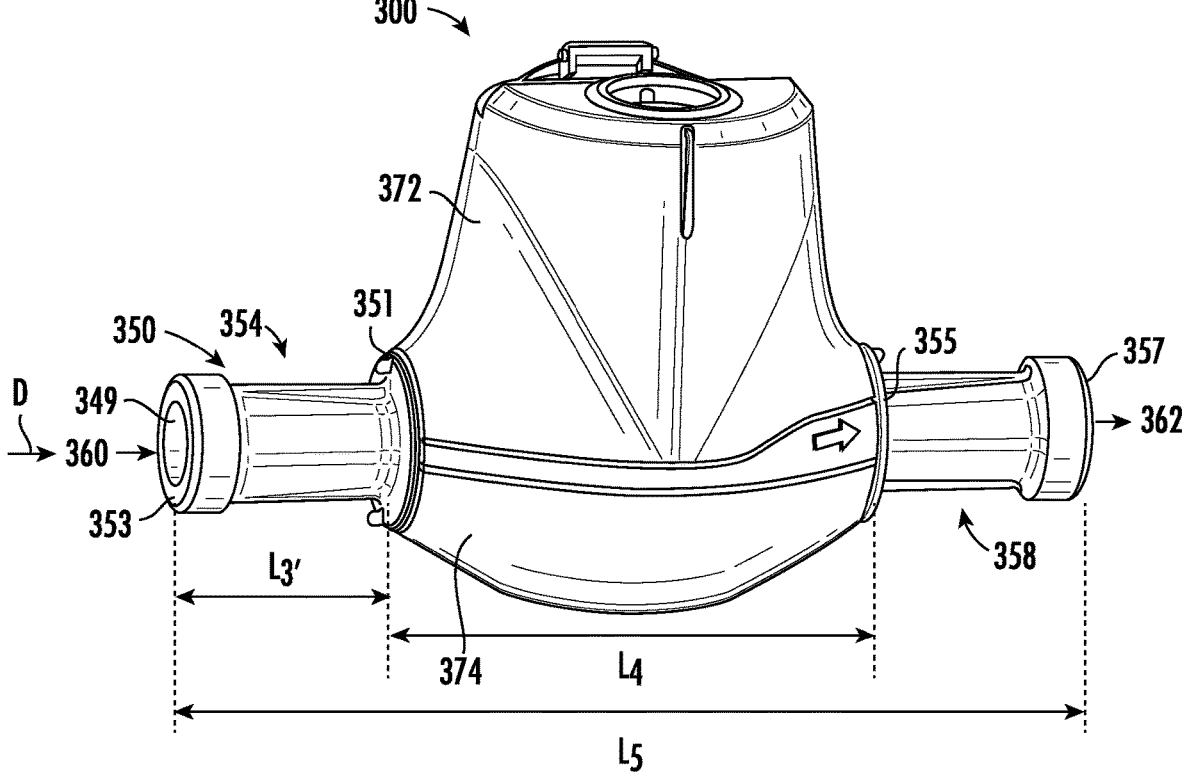

Referring now to FIGS. 6A and 6B, a metal enclosure in accordance with some embodiments of the present inventive concept will be discussed. FIGS. 6A and 6B show meters 300 with metal enclosures 350 of varying lengths and housings 370 assembled thereon. The first housing 372 and second housing 374 are connected to metal enclosures 350 via flanges 351, 355. In FIG. 6A, metal enclosure 350 includes inlet tube 354 and outlet tube 358 each having a length $L_3$ extending between flanges 351, 355 and distal ends 353, 357. As shown in FIG. 6A, length $L_3$ is relatively short. In contrast, metal enclosure 350 shown in FIG. 6B includes inlet tube 354 and outlet tube 358 each having a longer length $L_3'$ extending between flanges 351, 355 and distal ends 353, 357. Metal enclosure 350 can be configured to include varying length inlet tubes 354 and outlet tubes 358 as desired. While it may be desirable for inlet tube 354 and outlet tube 358 to have the same or similar lengths, each tube 354, 358 may have any length desired. Length $L_3$ may vary as needed or desired. Length $L_3$ also may vary depending upon meter size. In some embodiments, $L_3$ may vary from 25 mm to 67 mm.

As illustrated in FIGS. 3, 6A and 6B, housing 370 attaches at flanges 351 and 355 of metal enclosures 350. Thus, housing 370 extends across metal enclosure 350 a length $L_4$ between flanges 351 and 355 from a first side 371 to a second side 375. The first side 371 of first housing 372 connects at flange 351 and the second side 375 of first housing 372 connects at flange 355. A first side 373 of second housing 374 connects at flange 351 and a second side 377 of second housing 374 connects at flange 355. A length $L_5$ of metal enclosure 350 extends from distal end 353 to distal end 357. Consequently, metal enclosure 350, and specifically, inlet tube 354 and outlet tube 358 each extend beyond housing 370 in the direction D of flow. Inlet tube 354 extends upstream from the first side 371 of first housing 372 and outlet tube 358 extends downstream from the second side 375 of first housing 372. As shown in FIGS. 6B, the length $L_4$ of housing 370 in the direction D of flow is less than the length $L_5$ of metal enclosure 350. The total length $L_5$ of metal enclosure 350 extending from distal end 353 to distal end 357 may be adjusted as desired. For example, the lengths $L_3$, $L_3'$ of inlet tubes 354 and outlet tubes 358 may be advantageously adjusted without the need to redesign or reconfigure the portion of metal enclosure 350 that surrounds flowtube 310, i.e. the portion of metal enclosure 350 between flanges 351, 353 when viewing the metal enclosure 350 as assembled in FIGS. 6A and 6B. As such, a design of metal spuds 352, 356, from flanges 351, 355 to ends opposite the distal ends 353, 357 may remain the same to accommodate flowtubes 310.

In some embodiments of the present inventive concept, the metal components 352, 356 of the metal enclosure 350 are in line with the flowtube 301 and measuring chamber 320 and are electrically connected from the inlet 306 to the outlet 308. Furthermore, utilizing a metal frame may allow differing inlet and outlet sizes using the same flowtube or metrology engine.

Figure 7:
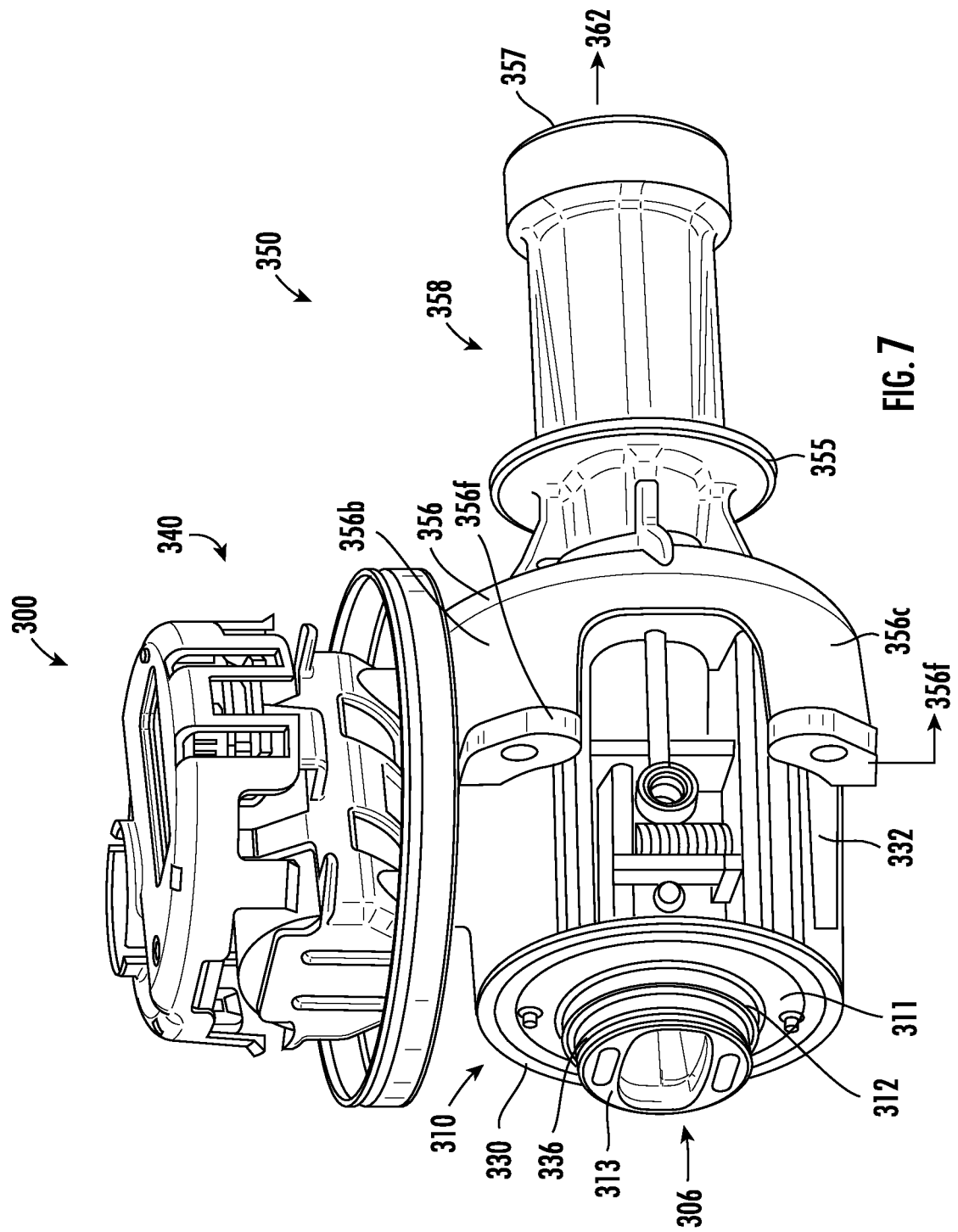
FIGS. 7 and 8 are diagrams illustrating the flowtubes and metal enclosures in accordance with some embodiments of the present inventive concept.
Figure 8:
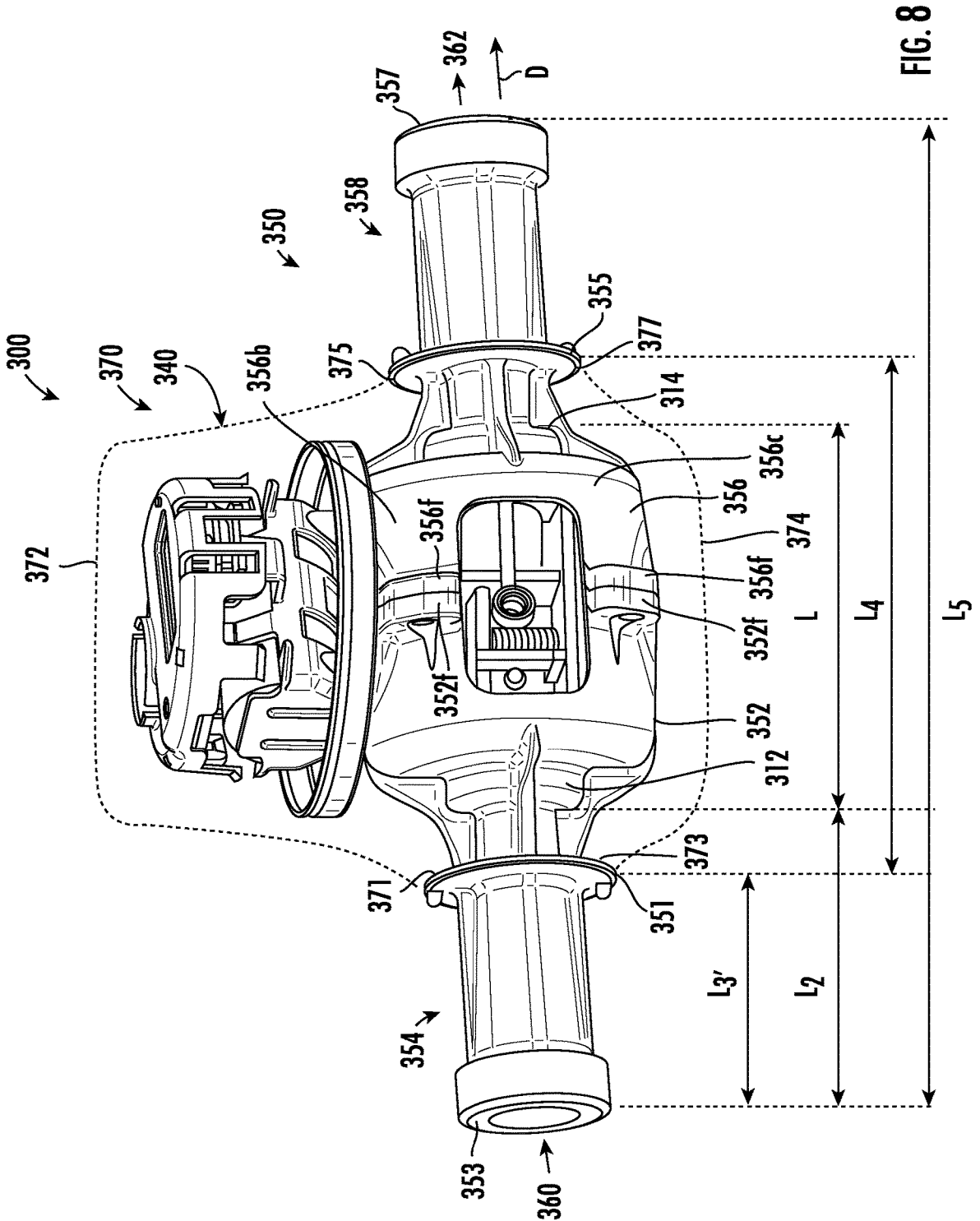

FIGS. 7 and 8 are diagrams illustrating the flowtubes 310 and metal enclosures 350 in accordance with some embodiments of the present inventive concept. A partially surrounded flowtube 310 and fully encapsulated flowtube 310 are shown respectively in FIGS. 7 and 8. In FIG. 7, the inlet 306 of flowtube 310 is shown and a metal spud 356 is attached to an outlet side of flowtube 310. The configuration of metal spuds 352, 356 is complementary to the configuration of flowtube 310 and potting shells 330, 332. Flowtube 310 includes potting shells 330, 332 mounted thereon and metal spud 356 is configured to accommodate potting shells 330, 332 and flowtube 310, specifically the distal end 315 and outlet tube 314. Similarly, metal spud 352 is configured to accommodate potting shells 330, 332 and flowtube 310, specifically, distal end 313 and inlet tube 312.

As illustrated in FIGS. 3, 7 and 8, each metal spud 352, 356 includes four legs with a flange at the free end, two legs 356b, 356c with two leg flanges 356f are shown in FIGS. 7 and 8. Legs 356a, 356b, 356c, 356d and leg flanges 356f are shown in FIG. 3. Metal spuds 352, 356 are connected to one another via leg flanges 352f, 356f (FIG. 8) and may be fastened with bolts, screws, fasteners, connectors, etc.

As shown in FIG. 7, inlet tube 312 and outlet tube 314 serve as male couplers whereas metal spuds 352, 356, and specifically, internal conduits 349, 359 serve as female couplers such that tubes 312, 314 can be coupled to conduits 349, 359 so that metal spuds 352, 356 are in fluid communication with flowtube 310 and measuring chamber 320. A seal, for example, a radially sealed gasket such as a tri-lobe seal 336 may be used to benefit the coupling. Other gaskets or seals, such as, a face seal gasket may also be preferred. As further shown, metal spuds 352, 356 are designed to complement flowtube 310 particularly in the region between flanges 351, 355 and legs 352a-d, 356a-d in which metal spuds 352, 356 are shaped to complement inlet tube 312 and outlet tube 314, respectively. As noted above, a seal 336 is provided between the metal spuds 352, 356 and flowtube 310.

As shown in FIG. 8, flowtube 310 is fully encapsulated by metal enclosure 350 and housing 370, shown in dotted lines. The flowtube 310 has a length L extending from the inlet distal end 313 to the outlet distal end 315 (FIG. 5). Metal enclosure 350 surrounds flowtube 310 and potting shells. Metal enclosure extends the length $L_5$ from inlet distal end 353 to outlet distal end 357. Housing 370, including first housing 372 and second housing 374, both represented by dotted lines, connects to metal enclosure 350 at flanges 351, 355. Housing 370 thus extends the length $L_4$ from first sides 371, 373 to second sides 375, 377 between flanges 351 and 353. As shown, flowtube length L is less than the housing length $L_4$ which is less than the metal enclosure length $L_5$. Thus, flowtube 310, according to the present inventive concept, is shorter than those known conventionally and flowtube 310 does not extend, in the direction D of flow, beyond housing 370 or metal enclosure 350 in either the upstream or downstream direction. Metal enclosure 350 can be adapted to different meter lengths and different flowtube 310 lengths. Metal enclosure 350 can be adapted to different threads to allow for installation in various conditions. Metal enclosure 350 can also be adapted to accommodate differing inlet and outlet sizes while using the same metrology engine.

Figure 9:
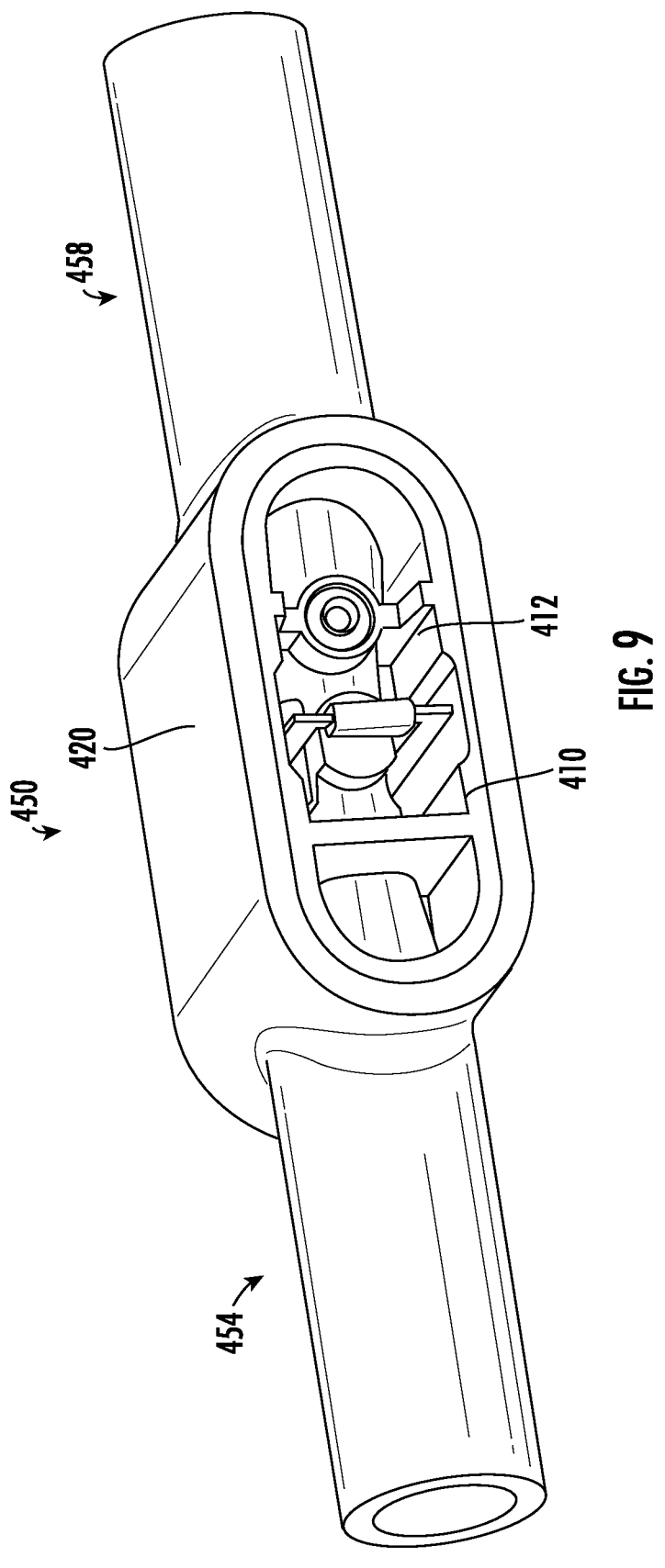
FIG. 9 is a diagram illustrating a flowtube and a metal enclosure in accordance with some embodiments of the present inventive concept.

FIG. 9 is a diagram illustrating a flowtube 410 and a metal enclosure 450 in accordance with some embodiments of the present inventive concept. Metal enclosure 450 is monolithic, i.e. one piece or one component. Metal enclosure 450 is configured to surround flowtube 410 and is configured to be in fluid communication with flowtube 410. Flowtube 410 includes a non-conductive measuring chamber 412. In some embodiments of the present inventive concept, flowtube 410 slides into a side of central chamber 420 of metal enclosure 450 as shown in FIG. 9, and in other embodiments, the flowtube 410 may be inserted into the top of metal enclosure 450. Radial seals may be used on at least one side of flowtube 410 and end caps may go over flowtube 410 and capture the seals. In other embodiments, flowtube 410 or metal enclosure 450 may capture a seal on at least one side of flowtube 410. Metal enclosure includes an inlet pipe 454 and an outlet pipe 458 both connected to central chamber 420. The inlet pipe 454 and outlet pipe 458 are in fluid communication with flowtube 410 when flowtube 410 is inside chamber 420. In the embodiment illustrated in FIG. 9, the flowtube 410 does not extend beyond the metal enclosure 450, i.e. distal ends of flowtube 410 are within metal enclosure 450. Metal enclosure 450 serves as a protective housing around flowtube 410. Additional features described above with respect to the embodiments illustrated in FIGS. 3 to 8 may also be present in metal enclosure 450.

The meters having the flowtubes in accordance with embodiments discussed herein is a shortened magnetic meter metrology engine. The flowtubes may be made of non-conductive material, for example, a polymer and/or plastic. The non-metal flowtubes should be large enough, so the magnetic meters function properly and allows for the metal enclosures to be in-line with the flowtubes and measuring chambers. It will be understood that the metal enclosures can be adapted to different meter specifications including different meter lengths and threads to allow for installation in various conditions.

As discussed briefly above, some embodiments of the present inventive concept provide a meter having a metrology engine, flowtube or pressure vessel that is made of a polymer and is short enough for the magnetic meter to function properly. The meter further has a structural frame that wraps around the metrology engine without becoming overly large. It will be understood that the interface shape for the structural frame may be customized to ensure proper metrological functions in all installation conditions.

Furthermore, although embodiments of the present inventive discuss a metal enclosure having first and second components, embodiments of the present inventive concept are not limited thereto. For example, a single piece metal flowtube together with a plastic insert forming a non-conductive flowtube may be provided. However, depending on the assembly method, a potted measuring assembly may be completely submerged in the water stream, which may lead to increased risk of environmental failure. In some embodiments, the entire assembly may be face sealed and the module may be slid between two faces. Although this could potentially work, the unit is sealed by pulling against two pipes to compress the face seals in the field, which would work directly against the face seals. Accordingly, the radially sealed gasket may be a preferred method of sealing the metal portions to the polymer portion.

Providing magnetic meters having a metallic structural frame as discussed herein allows for use of these meters in areas where the current polymer meters are limited due to soil conditions, ground movement, external forces or previous bad experiences with fully composite meters. Providing metallic frames makes the meters stronger and allows the meters to resist deflection and deformation once installed.

In the specification, there have been disclosed embodiments of the inventive concept and, although specific terms are used, they are used in a generic and descriptive sense only and not for purposes of limitation.

What is claimed is:

1. A magnetic meter comprising:
a flowtube having an inlet on a first end and an outlet on a second end, the inlet and the outlet defining a direction of flow;
a metal enclosure surrounding the flowtube, the metal enclosure being in fluid communication with the inlet and the outlet of the flowtube, the metal enclosure extending, in the direction of flow, upstream beyond the inlet on the first end and downstream beyond the outlet on the second end of the flowtube,
wherein the metal enclosure includes at least two base components, each of the at least two base components having a plurality of legs, the plurality of legs of a first of the at least two base components coupling the plurality of legs of a second of the at least two base components to connect the first and second base components such that the metal enclosure surrounds the flowtube; and
a housing surrounding the flowtube and the metal enclosure, wherein a length of the flowtube is shorter than a length of the housing.

2. The magnetic meter of claim 1, wherein the housing extends in the direction of flow, upstream beyond the inlet on the first end and downstream beyond the outlet on the second end of the flowtube.

3. The magnetic meter of claim 2, wherein the metal enclosure extends, in the direction of flow, beyond the housing in at least one of upstream and downstream directions.

4. The magnetic meter of claim 2, wherein, in the direction of flow, a length of the flowtube from the first end to the second end is less than a length of the housing.

5. The magnetic meter of claim 4, wherein, in the direction of flow, the length of the housing is less than a length of the metal enclosure.

6. The magnetic meter of claim 1, wherein the flowtube includes a chamber between the inlet and the outlet.

7. The magnetic meter of claim 6, wherein the flowtube includes an inlet tube upstream of the chamber in the direction of flow and an outlet tube downstream of the chamber in the direction of flow, the inlet tube including the first end and inlet, the outlet tube including the second end and outlet.

8. The magnetic meter of claim 6, further comprising:
a magnetic assembly adjacent the chamber, the metal enclosure surrounding the magnetic assembly; and
a meter register near the flowtube, the meter register positioned outside of the metal enclosure.

9. The magnetic meter of claim 8, wherein the housing surrounds the flowtube, the metal enclosure, the magnetic assembly and the meter register, the housing extending, in the direction of flow, upstream beyond the inlet on the first end and downstream beyond the outlet on the second end of the flowtube.

10. The magnetic meter of claim 1, wherein the metal enclosure includes a plurality of connectable components, wherein, when connected, the plurality of connectable components extends, in the direction of flow, upstream beyond the inlet on the first end and downstream beyond the outlet on the second end of the flowtube.

11. The magnetic meter of claim 1, wherein the flowtube is electrically non-conductive and the metal enclosure is electrically conductive.

12. The magnetic meter of claim 1, wherein the flowtube comprises a plastic and/or a polymer.

13. The magnetic meter of claim 1, wherein the metal enclosure includes a meter inlet tube having a first internal conduit in fluid communication with the inlet and a meter outlet tube having a second internal conduit in fluid communication with the outlet.

14. The magnetic meter of claim 13, wherein the first internal conduit extends from the inlet upstream in the direction of flow and the second internal conduit extends from the outlet downstream in the direction of flow.

15. The magnetic meter of claim 13, wherein the housing surrounds the flowtube, the metal enclosure, the first internal conduit and the second internal conduit;

the housing extending, in the direction of flow, upstream beyond the inlet on the first end and downstream beyond the outlet on the second end of the flowtube;

the meter inlet tube extending, in the direction of flow, upstream beyond the housing; and the meter outlet tube extending, in the direction of flow, downstream beyond the housing.

16. The magnetic meter of claim 13, wherein the meter inlet tube or the meter outlet tube include metal threads.

17. The magnetic meter of claim 1, wherein a length of the flowtube from the first end to the second end in the direction of flow is less than a length of the metal enclosure in the direction of flow.

18. The magnetic meter of claim 1, wherein the metal enclosure includes metal threads.

19. The magnetic meter of claim 1, wherein the metal enclosure includes a plurality of metal pieces.

20. The magnetic meter of claim 1, wherein the metal enclosure is comprised of one piece.

21. The magnetic meter of claim 1, wherein the at least two base components comprise two base components and wherein each of the two base components include four legs, each having a flange at a free end of the base component.

\*　\*　\*　\*　\*